United States Patent [19]
Schulthess et al.

[11] Patent Number: 5,989,475
[45] Date of Patent: Nov. 23, 1999

[54] PROCESS FOR THE STEREOLITHOGRAPHIC PREPARATION OF THREE-DIMENSIONAL OBJECTS USING A RADIATION-CURABLE LIQUID FORMULATION WHICH CONTAINS FILLERS

[75] Inventors: Adrian Schulthess, Tentlingen; Bettina Steinmann, Praroman; Manfred Hofmann, Marly, all of Switzerland

[73] Assignee: Ciba Specialty Chemicals Corp., Tarrytown, N.Y.

[21] Appl. No.: 09/091,452

[22] PCT Filed: Dec. 10, 1996

[86] PCT No.: PCT/EP96/05508

§ 371 Date: Jun. 18, 1998

§ 102(e) Date: Jun. 18, 1998

[87] PCT Pub. No.: WO97/23342

PCT Pub. Date: Jul. 3, 1997

[30] Foreign Application Priority Data

Dec. 22, 1995 [CH] Switzerland .............................. 3671/95
Jun. 25, 1996 [CH] Switzerland .............................. 1588/96

[51] Int. Cl.⁶ .......................... B29C 35/08; B29C 41/02; B29C 41/52
[52] U.S. Cl. .......................... 264/401; 264/308; 264/409
[58] Field of Search ................................... 264/308, 401, 264/409

[56] References Cited

U.S. PATENT DOCUMENTS

| | | | |
|---|---|---|---|
| 4,942,066 | 7/1990 | Fan et al. ............................. | 264/401 X |
| 5,605,941 | 2/1997 | Steinmann et al. ...................... | 522/170 |
| 5,705,316 | 1/1998 | Steinmann et al. ...................... | 430/269 |
| 5,783,358 | 7/1998 | Schulthess et al. ..................... | 430/269 |
| 5,783,615 | 7/1998 | Steinmann et al. ...................... | 522/170 |
| 5,783,712 | 7/1998 | Steinmann et al. ...................... | 549/554 |

FOREIGN PATENT DOCUMENTS 0250121 12/1987 European Pat. Off. .
60-247515 12/1985 Japan .

OTHER PUBLICATIONS

T. Nakai et al, "Photopolymerization of Photopolymers by Scanning Laser Beam", pp. 14–22 (Translation also enclosed) (Jan. 1988).
Derwent Abstr. 97–094932, JP 8332673 (Published Dec. 17, 1996).
Patent Abstracts of Japan, vol. 18, No. 65 for JP 5286040 (Published Nov. 2, 1993).
Patent Abstracts of Japan, vol. 18, No. 636 for JP 6246837 (Published Sep. 6, 1994).
Patent Abstracts of Japan, vol. 96, No. 10 for JP 8150662 (Published Jun. 11, 1996).
Patent Abstracts of Japan, vol. 96, No. 8 for JP 8099360 (Published Apr. 16, 1996).
Patent Abstracts of Japan, vol. 13, No. 400 for JP 1145142 (Published Jun. 7, 1989).
Patent Abstracts of Japan, vol. 11, No. 221 for JP 62037109 (Published Feb. 18, 1987).

Primary Examiner—Leo B. Tentoni
Attorney, Agent, or Firm—David R. Crichton; Michele A. Kovaleski

[57] ABSTRACT

The present invention relates to a process for the stereolithographic preparation of a three-dimensional object, wherein the object is built in a container which contains a radiation-curable liquid formulation with fillers by a repeated alternating succession of process steps (a) and (b). In step (a), a layer of the radiation-curable liquid formulation, one limitation of which is the surface of the formulation, is cured using suitable radiation within an surface area which corresponds to the desired cross-section of the three-dimensional object to be formed at the level of this layer. In step (b), said cured layer is coated with a new layer of the radiation-curable liquid formulation. The process comprises homogenizing the radiation-curable liquid formulation continuously or discontinuously to such an extent that there is no noticeable change in the filler content of the radiation-curable liquid formulation in the area of that layer with which the cured layer is coated in step (b). This process enables the skilled person to choose fillers solely according to the purpose envisaged therefor without encountering technical problems or problems relating to the quality of the stereolithographically produced object resulting from sedimentation of the fillers during preparation of the object.

9 Claims, No Drawings

PROCESS FOR THE STEREOLITHOGRAPHIC PREPARATION OF THREE-DIMENSIONAL OBJECTS USING A RADIATION-CURABLE LIQUID FORMULATION WHICH CONTAINS FILLERS

The present invention relates to a stereolithographic process for the preparation of three-dimensional objects.

BACKGROUND

The preparation of intricately formed three-dimensional objects using stereolithography has been known for a long time. The desired object is usually built in a container which contains a radiation-curable liquid formulation (hereinafter also termed "stereolithographic resin") by a repeated alternating succession of two process steps (a) and (b), wherein in step (a) a layer of the radiation-curable liquid formulation, one limitation of which is the surface of the formulation, is cured by suitable radiation using usually a, preferably computer-controlled, laser source within an area which corresponds to the desired cross-section of the object to be built at the level of this layer, and wherein in step (b) a new layer of the radiation-curable liquid formulation is formed on said cured layer.

In some cases it is advantageous to use a radiation-curable liquid formulation which contains fillers.

As is disclosed, inter alia, in U.S. Pat. No. 4,942,066, e.g. specific fillers can be used to advantageously control the depth of penetration of the laser beam into the stereolithographic resin, which laser beam is usually used for curing the radiation-curable liquid formulation in the stereolithographic process described above.

It is also known that fillers, for example $Al_2O_3$ or graphite, reduce the loss in volume during the curing of a stereolithographic formulation and therefore result in stereolithographically produced objects which are formed particularly accurately (T. Nakai and Y. Marutani; Reza Kenkyu, January 1988, pages 14–22).

Furthermore, JP-A-247515/1985 describes the addition of finely particulate materials, such as pigments, powdered ceramic and powdered metal, to stereolithographic resins in order to produce decorative effects, lower abrasion or electric conductivity in stereolithographically produced objects.

EP-A-0 250 121 discloses the addition of filler particles to a stereolithographic resin, which are transparent to the radiation used for the curing, in order to reduce the amount of the resin material which needs to be cured, resulting in a reduction of the radiation dosage required for the curing, i.e. in an increase of the radiation sensitivity of the stereolithographic resin.

However, working with filler-containing stereolithographic resins such as the ones described above, often leads to problems because, depending on the density of the filler and of the liquid residual stereolithographic resin, after some time the fillers either float to the surface or they sediment in the stereolithographic resin bath. Because of this, the filler content of stereolithographic resin in the bath changes very quickly, in particular where there are substantial differences in density between filler and residual resin and especially in the area close to the surface of the stereolithographic resin bath which is important for stereolithography. If filler and residual resin are of different density it is therefore in many cases not possible to obtain objects having material properties which are sufficiently uniform because the properties of stereolithographic resin on the one hand, e.g. its radiation sensitivity, and, on the other hand, those properties of the cured material which depend on the fillers, e.g. on its conductivity or mechanical properties, can change in uncontrolled manner.

The invention provides a generally usable and technically safe solution to said problem, which can be used for stereolithographic resins of any composition which can also contain any fillers, including fillers having a relatively large particle size and which therefore sediment quickly, or which have a density which is substantially larger than the customary density of the residual stereolithographic resin, which is usually in the range of only 1 to 1.3 g/cm$^3$. Accordingly, this invention enables the skilled person to choose fillers solely according to the purpose envisaged therefor without having to fear technical problems or uncontrolled deviations in the quality of the stereolithographically produced objects.

DESCRIPTION OF THE INVENTION

To this purpose this invention provides a process for the stereolithographic preparation of a three-dimensional object, wherein the object is built in a container which contains a radiation-curable liquid formulation with fillers by a repeated alternating succession of process steps (a) and (b), wherein in step (a) a layer of the radiation-curable liquid formulation, one limitation of which layer is the surface of the formulation, is cured using suitable radiation within a surface area which corresponds to the desired cross-section of the three-dimensional object to be formed at the level of this layer, and wherein in step (b) a new layer of the radiation-curable liquid formulation is formed on said cured layer, which process comprises homogenising the radiation-curable liquid formulation during the preparation of the object continuously or discontinuously to such an extent that there is no noticeable change, preferably no change, in the filler content of the radiation-curable liquid formulation in the area of that layer which is formed in step (b) on the cured layer obtained in step (a).

In this process the homogenisation of the radiation-curable liquid formulation containing fillers can be carried out in any manner, provided that care is taken that the layer curing process in the building of the object is not disturbed thereby. The process proposed according to this invention can, after minor changes relating to the apparatus, be used in practically all stereolithographic apparatus, including those which are commercially available at present.

It is possible, for example, to interrupt the succession of the above-mentioned steps (a) and (b) during the preparation of the object once or several times and to homogenise the radiation-curable liquid formulation during this time in the container in which the three-dimensional body is built.

A preferred embodiment of this process comprises building the three-dimensional object on a carrier as a base plate which is installed in vertically movable manner in the container which contains the radiation-curable liquid formulation, lowering the carrier after curing each layer of the object further so that the new layer of the radiation-curable liquid formulation is formed between the surface of the radiation-curable liquid formulations and the surface of the last cured layer of the object, and carrying out the homogenisation of the radiation-curable liquid formulation by movement(s) of the carrier.

Because in many stereolithographic apparatus using a carrier which can be moved in vertical direction in a bath of the stereolithographic resin, the carrier is already at present lowered by computer control after curing one partial layer of the object, it is possible to change these apparatus such that the carrier, after curing a specific number of partial layers, moves up and down by computer control, which movements serve to equilibrate a filler content which varies along the vertical axis of the stereolithographic bath.

In another embodiment of the novel process, the homogenisation is carried out completely or in part using a stirring device which is different from a possibly present carrier for the object, which device is installed in the container in which the object is built.

The homogenisation of the stereolithographic resin can be carried out equally well outside the container in which the object is built. To this end it is possible to remove the stereolithographic resin e.g. after curing each or several layers of the object, preferably from the bottom of the container in which the three-dimensional object is built and to transfer it from there to a second container in which an active stirring device homogenises the stereolithographic resin which is present in this container. Subsequently, the freshly homogenised stereolithographic resin is transferred from the second container back to the one in which the object is built. The addition of this resin to said container is particularly preferably carried out in uniform distribution over the surface area of the container. The building of the object can then be continued by curing another layer. This process variant has the advantage that a continuous homogenisation of the resin is also possible in simple manner.

The required intensity of the homogenisation of the stereolithographic resin depends on its formulation, in particular on the amount, density and particle size of the filler used and on the density and viscosity of the residual stereolithographic resin. The skilled person desiring to use the novel process must possibly determine by some routine tests, e.g. by measuring the sedimentation rate of the filler, after what time and for how long the stereolithographic resin needs to be homogenised.

In another preferred embodiment of the novel process, the intensity of the homogenisation of the radiation-curable liquid formulation is controlled as a function of the filler content in a layer which is directly below the surface of the radiation-curable liquid formulation in the container in which the object is built, the filler content in this layer being checked e.g. by turbidity measurements.

The homogenisation is particularly preferably controlled as a function of the filler content in the layer between the surface of the radiation-curable liquid formulation and the surface of the last cured layer of the object. This control can, for example, usefully be achieved based on measurements of the reflected amount of the light beam or laser beam with which said surface of the radiation-curable liquid formulation is irradiated, typically using a photodiode circuit. In the course of time, floating of the filler increases the reflected amount of the radiation by increased scattering whereas sedimentation of the filler reduces the reflected amount.

EXAMPLES

Example 1

The individual components of the formulations form. 1 to form. 3 described in Table 1 are weighed and mixed in a flask equipped with a mechanical stirrer for 1 hour at 40° C. The viscosity of the formulations is then determined using a Brookfield viscosimeter DV II (spindle size 34 with small sample adaptor) at 30° C.

TABLE 1

| Component | Form. 1 | Form. 2 | Form. 3 |
|---|---|---|---|
| ethoxylated diacrylate of bisphenol A[1] | 43 g | 38 g | 33 g |
| dimethacrylate of bisphenol A[2] | 43 g | 38 g | 33 g |
| 1-hydroxycyclohexylphenyl ketone[3] | 4 g | 4 g | 4 g |
| Ballotini microglass beads type S-3000, S3[4] | 10 g | 20 g | 30 g |
| viscosity at 30° C. | 865 mPa s | 1060 mPas | 1330 mPa s |

[1]Sartomer SR 349, supplied by Sartomer, USA;
[2]Sartomer SR 348, supplied by Sartomer, USA.;
[3]Irgacure 184, supplied by Ciba-Geigy AG, Switzerland;
[4]product of Potters-Ballotini, Germany The sedimentation rate of the formulations form. 1 to form. 3 is determined as follows: One test tube each, 18 cm high, 18 mm outer diameter and 15 mm inner diameter, is filled with one of the freshly mixed formulations cited in Table 1 up to a level of 15 cm. The test tubes are stored in a draught-free place protected from light and the level of the clear solution over the microglass beads in each of the test tubes is measured every 24 hours. The values are listed in Table 2.

TABLE 2

| Days (d) | Form. 1 | Form. 2 | Form. 3 |
|---|---|---|---|
| 0 | 0 mm | 0 mm | 0 mm |
| 1 | 11 mm | 5.5 mm | 3 mm |
| 2 | 24 mm | 10 mm | 5 mm |
| 3 | 44 mm | 18 mm | 9 mm |
| 6 | 86 mm | 34 mm | 17 mm |
| gradient of the regression line | 14.7 mm/d | 5.7 mm/d | 2.8 mm/d |
| time until the glass beads sediment by 0.1 mm | 9.8 min | 25 min | 50.3 min |

To determine the sediment ation rate, a regression line was determined by the smallest square error method. The gradient of the line indicates by how many millimeters per day the microglass beads sediment. Because the building times of stereolithographic objects are typically in the range from some hours to several days it is obviously hardly possible to prepare uniformly composed stereolithographic objects with fillers without using these measures for stabilising the distribution of a filler in a stereolithographic mixture if the density of these fillers is very different from the resin matrix.

The photosensitivity of formulation form. 2 is determined by the Window Pane technique which is described by Paul F. Jacobs in "Rapid Prototyping & Manufacturing, Fundamentals of stereolithography", Verlag SME, Dearborn, Mich. USA., pages 263 to 277, in a stereolithographic apparatus SLA 250/40, supplied by 3D Systems Corp., Valencia USA, which is equipped with a He/Cd laser having a power of 15 mW at 325 nm. The resin formulation form, 2 has a critical energy Ec of 6.97 mJ/cm and a depth of penetration Dp of 6.99 mils (171 μm).

Example 2

A) 600 g of the liquid resin formulation form. 2 are filled into a 500 ml glass beaker having a diameter of 8 cm, the resin bath having a level of 13 cm. Using the above-mentioned stereolithographic apparatus, a cuboid is prepared having a length of 25 mm, a width of 12 mm and a height of 100 mm. This is done in accordance with the description of the apparatus manual. First a 0.25 mm cross-section of the cuboid is prepared. This radiation-cured layer is then lowered in the resin bath by 4 mm, calculated from the surface of the cured layer to the surface of the resin bath, and is then raised again in the resin bath to such an extent that the distance between the surface of the radiation-cured layer and the surface of the resin bath is 0.25 mm. After allowing this resin layer to settle for 30 seconds, it is also cured with the laser beam. This procedure is continued until the radiation-cured cuboid green model is ready.

B) Another object is prepared as described above for A). However, in order to better stabilise the distribution of the filler in the resin formulation, after curing each layer the radiation-cured object is not only lowered by 4 mm, as is recommended in the 3D-Systems manual, but by 70 mm to 10 mm, the lowering speed in each case being 50 mm/s. After stopping for one second stop at the lowest point, the object is then raised in the resin bath at the same speed to such an extent that the distance between the surface of the radiation-cured layer and the surface of the liquid bath is 0.25 mm.

After a 1 hour postcure in a commercial postcuring oven, supplied by 3D Systems Corp., the two cuboids obtained according to the instructions A) and B) are sawed with a diamond saw into 1 cm plates. The plates of the object obtained according to instruction A) without special homogenisation become more and more transparent from bottom to top. For better quantification of this effect, a 1 mm plate is separated from the upper end of each of the 1 cm plates of the two cuboids with a diamond saw. These plates are weighed with a chemical balance and are then ashed in a muffle furnace at 1000° C. where the resin matrix is burnt completely. The remaining filler is also weighed with a chemical balance.

Table 3 contrasts the filler content of the layers at different levels for both cuboids. It can be seen from that table that already at a building level of 5 cm the test sample prepared according to instruction (A), i.e. without homogenisation of the filler, contains only traces of filler. Therefore, in this procedure those properties of the stereolithographic object which depend on the filler content, e.g. the mechanical properties, change very much and in uncontrolled manner. The distribution of the filler can be substantially enhanced using the simple homogenisation carried out according to this invention.

TABLE 3

| Method of preparation | (A) without homogenisation | (B) acc. to the invention |
|---|---|---|
| building level from which the layer was taken, in cm | filler content in % by weight | filler content in % by weight |
| 1 | 12.3 | 17.1 |
| 2 | 10.3 | 14.8 |
| 3 | 8.3 | 13.2 |
| 4 | 4.0 | 12.7 |
| 5 | 0.1 | 12.4 |
| 6 | 0.0 | 11.5 |
| 7 | 0.0 | 10.7 |
| 8 | 0.0 | 9.8 |
| 9 | 0.0 | 8.6 |
| 10 | 0.0 | 7.9 |

What is claimed is:

1. A process for the stereolithographic preparation of a three-dimensional object, wherein the object is built in a container which contains a radiation-curable liquid formulation with fillers by a repeated alternating succession of process steps (a) and (b), wherein in step (a) a layer of the radiation-curable liquid formulation, one limitation of which is the surface of the formulation, is cured using suitable radiation within an surface area which corresponds to the desired cross-section of the three-dimensional object to be formed at the level of this layer, and wherein in step (b) the cured layer is coated with a new layer of the radiation-curable liquid formulation, which process comprises homogenising the radiation-curable liquid formulation while contained in said container during said process continuously or discontinuously to such an extent that there is no noticeable change in the filler content of the radiation-curable liquid formulation in the area of that layer with which the cured layer is coated in step (b).

2. A process according to claim 1, which comprises interrupting the succession of steps (a) and (b) during the preparation of the three-dimensional object once or several times and homogenising the radiation-curable liquid formulation during this time in the container in which the three-dimensional object is built.

3. A process according to claim 2, which comprises building the three-dimensional object on a carrier as base plate which is installed such that it is moved in vertical direction in the container which contains the radiation-curable liquid formulation, lowering the carrier after the curing of each layer of the three-dimensional object further into the container with the radiation-curable liquid formulation such that the new layer of the radiation-curable liquid formulation forms between the surface of the radiation-curable liquid formulation and the surface of the last cured layer of the object, and carrying out the homogenisation of the radiation-curable liquid formulation by movement(s) of the carrier.

4. A process according to claim 3, wherein the homogenisation is carried out at least in part using a stirring device which is installed in the container in which the three-dimensional object is built.

5. A process according to claim 1, which further comprises removing the radiation-curable liquid formulation after curing each or several layers of the object from the container in which the three-dimensional object is built and to transfer it from there to a second container in which a stirring device homogenises the formulation which is present in said second container, and then transferring the freshly homogenised radiation-curable liquid formulation from the second container back to the one in which the object is built, and continuing to build the object by curing the next layer.

6. A process according to claim 5, wherein the stirring device is continuously active.

7. A process according to claim 1, which comprises controlling the intensity of the homogenisation of the radiation-curable liquid formulation as a function of the filler content in a layer directly below the surface of the radiation-curable liquid formulation in the container in which the object is built.

8. A process according to claim 7, wherein the control is carried out based on the reflected amount of the light beam or laser beam with which said surface of the radiation-curable liquid formulation is irradiated.

9. A process according to claim 2, wherein the homogenisation is carried out at least in part using a stirring device which is installed in the container in which the three-dimensional object is built.

* * * * *